United States Patent [19]

Berglund

[11] 4,318,998
[45] Mar. 9, 1982

[54] CELLULAR PLASTIC ADDITIVE

[75] Inventor: Jan-Olof V. Berglund, Lomma, Sweden

[73] Assignee: Jan Berglund Produktions AB, Lomma, Sweden

[21] Appl. No.: 237,141

[22] PCT Filed: Jun. 12, 1980

[86] PCT No.: PCT/SE80/00167
§ 371 Date: Feb. 18, 1981
§ 102(e) Date: Feb. 18, 1981

[87] PCT Pub. No.: WO80/02845
PCT Pub. Date: Dec. 24, 1980

[30] Foreign Application Priority Data

Jun. 19, 1979 [SE] Sweden ................................. 7905380

[51] Int. Cl.$^3$ ............................................... C08J 9/22
[52] U.S. Cl. ......................................... 521/54; 521/55; 521/65; 521/68; 521/70; 521/91; 521/136
[58] Field of Search ....................... 521/91, 54, 55, 136

[56] References Cited

U.S. PATENT DOCUMENTS

| | | | |
|---|---|---|---|
| 2,862,834 | 12/1958 | Hiler | 521/54 |
| 3,023,136 | 2/1962 | Himmelheber et al. | 521/54 |
| 3,251,916 | 5/1966 | Newnham et al. | 521/54 |
| 3,277,026 | 10/1966 | Newnham et al. | 521/54 |
| 4,240,998 | 12/1980 | Lichter et al. | 521/54 |
| 4,241,190 | 12/1980 | Lichter et al. | 54/54 |

Primary Examiner—Morton Foelak
Attorney, Agent, or Firm—Berman, Aisenberg & Platt

[57] ABSTRACT

Additive of the cellular plastic type, method for manufacturing the additive and use of the additive. The additive is intended to be mixed with a hardening or air-drying component, preferably, liquid paint. The additive of this invention is characterized in that a mixture of closed cellular plastic particles, disintegrated foamed urea formaldehyde resin and chopped fiberglass filaments or strands from part of the additive.

6 Claims, 1 Drawing Figure

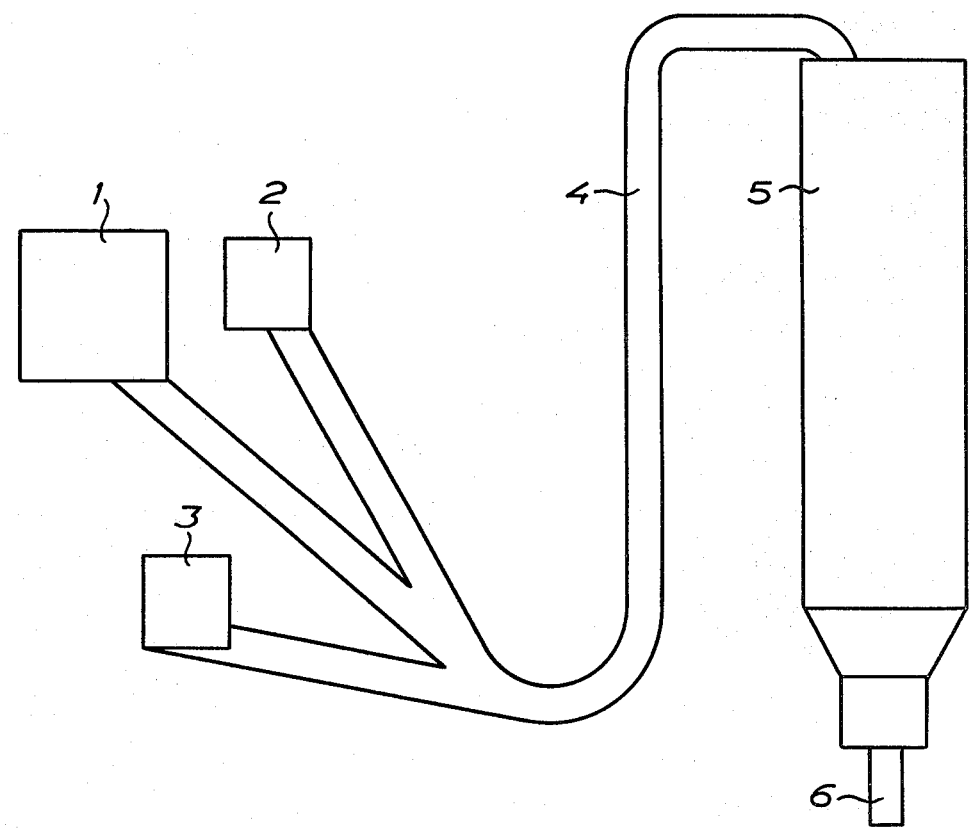

CELLULAR PLASTIC ADDITIVE

This invention relates to a cellular plastic additive to be mixed with a hardening or air-drying component, preferably consisting of a liquid paint, the additive of the invention imparting to the paint a textured surface which applied on a support.

Ready mixed texturing paints and compositions are previously known and are available on the market. Generally, these compositions consist of ready mixed thick filler or putty type paint compounds. Special tools, such as rollers with a patterned surface, or toothed spatulas have to be used for the application of such compounds. Often the compound is applied to the support by using a specific spray method. The textured surface coating obtained by using these compounds consists of a thick and very hard coating with a weight up to 8 kg/m$^2$. The heavy weight of the coating requires a rigid support of high bearing capacity, and additionally the removal of such a compound is time-consuming and expensive. It is often necessary to grind off at least the surface layer to provide a smooth surface. This grinding operation will cause a heavy production of dust. The time of storing these compounds is limited, and the use thereof is restricted to indoor use. Available texture compounds most often are white, but when large amounts are ordered, other colours can be obtained as well.

The additive of this invention can be used not only as a texturing additive but also with e.g. a water soluble two-component adhesive. Then, the additive may be used as a filler or a repairing compound or for application on a surface to form a sound-damping and/or insulating layer thereon.

It is a primary object of this invention to provide an additive of cellular plastic type to be mixed with a hardening or air-drying component which is light, cheap and can be mixed with most prefabricated standard paints, filling compounds, adhesives, etc.

It is a further object of this invention to provide an additive which is neutral, i.e. an additive which has no adverse affect on the compound with which it is to be mixed.

A still further object of this invention is to provide a method for manufacturing the additive of cellular plastic type, by which a homogeneous mixture of the components included into the additive is obtained.

Additional objects and advantages of the invention in part will be set forth in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the additive of this invention to be mixed with a hardening of air-drying component, e.g. a liquid paint, comprises a mixture of closed cellular plastic particles, disintegrated foamed urea formaldehyde resin, and chopped fibreglass filaments or strands.

The invention also includes the use of the additive as a texturing agent in a liquid paint.

Preferably, marble powder is included into the disintegrated foamed formaldehyde resin.

It is also preferred that the cellular plastic particles forming part of the additive, consist of expanded polystyrene, such as Styropor. By using a mixture of closed cellular plastic particles, disintegrated urea formaldehyde resin and chopped fibreglass filaments or strands in the additive of the invention, this can easily be stirred down e.g. into a paint. Then, the closed cellular plastic particles will act as the primary texture developing component of the additive. The disintegrated cured foamed urea formaldehyde resin will absorb the paint and will act as a thickening agent. It will also promote a uniform distribution and deposition of the closed cellular plastic particles on the surface to be treated. The purpose of the chopped fibreglass filaments or strands is to act as a reinforcement in the textured layer. This reinforcement is necessary to prevent cracking of the hardened or dried mixture of additive and paint or other similar liquid.

By mixing e.g. marble powder into the disintegrated urea formaldehyde resin, the latter will increase in weight, which means that it can be mixed more rapidly with the hardening or air-drying component.

It is preferred that the closed cellular plastic particles of the additive of the invention comprise expanded polystyrene, such as Styropor.

It is also preferred that the additive comprises, by weight, 70% cellular plastic particles, 15% disintegrated foamed urea formaldehyde resin and 15% chopped fibreglass filaments or strands.

Preferably, the size of the closed cellular plastic particles ranges from 0.2 to 3.0 mm; the size of the disintegrated urea formaldehyde resin ranges from 2 to 10 mm; and the length of the chopped fibreglass filaments or strands ranges from 4 to 7 mm.

The accompanying drawing which is incorporated in and constitutes a part of this specification, illustrates diagrammatically a method for manufacturing the additive of the invention.

In the drawing hoppers 1, 2 and 3 for the different components of the additive are shown, i.e. the hopper 1 contains closed cellular plastic particles, the hopper 2 contains disintegrated urea formaldehyde resin and the hopper 3 contains chopped fibreglass filaments or strands. From these hoppers the components are supplied, e.g. by adjustable screw conveyors, to an air-conveying pipe 4 in which the components form a uniform mixture which is delivered to a silo 5. A portioning means 6 is diagrammatically shown at the base of the silo 5. Such means can be adjustable for cooperation with different types of packages.

The additive of this invention has a volume/weight ratio of about 50 g/dm$^3$ and the storing-time thereof is practically unlimited. Another valuable feature of the additive is that the dried or hardened mixture in which the additive is included, can be removed easily from a surface by means of a sharp-edged tool. By using this tool the cellular plastic particles are cut, the remaining paint or adhesive forming a smooth surface.

It will be apparent to those skilled in the art that various other modifications and variations in addition to those mentioned above could be made with regard to the additive of the invention and the method of manufacturing the same within the scope of the invention.

I claim:

1. A texturing additive of a cellular plastic type to be mixed with a hardening or air-drying liquid characterized in that the additive comprises the combination of closed cellular expanded polystyrene particles having a particle size in the range of 0.2 to 3.0 mm., disintegrated foamed urea-formaldehyde resin having a particle size in the range of 2 to 10 mm. and chopped fiberglass filaments or strands having a length which ranges from 4 to 7 mm.

2. An additive according to claim 1, characterized in that marble powder is mixed into the disintegrated foamed urea formaldehyde resin.

3. An additive according to claim 1, characterized in that the closed cellular plastic particles comprise expanded polystyrene.

4. An additive according to claim 1, characterized in that the additive comprises, by weight, 70% closed cellular plastic particles, 15% disintegrated foamed urea formaldehyde resin, and 15% chopped fibreglass filaments or strands.

5. A method for manufacturing an additive of the cellular plastic type to be mixed with a hardening or air-drying component, according to claim 1, characterized in that closed cellular plastic particles, disintegrated foamed urea formaldehyde resin and chopped fibreglass filaments or strands in a proper relationship are supplied to an air-conveying conduit to form a uniform mixture of the components when carried to a silo through said conduit.

6. A method of making a paint which comprised incorporating the additive of claim 1 into a hardening or air-drying paint.

* * * * *